(12) United States Patent
Brushkivskyy

(10) Patent No.: US 12,176,797 B2
(45) Date of Patent: Dec. 24, 2024

(54) ELECTRIC MOTOR

(71) Applicant: ZF Friedrichshafen AG, Friedrichshafen (DE)

(72) Inventor: Vyacheslav Brushkivskyy, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 198 days.

(21) Appl. No.: 17/864,800

(22) Filed: Jul. 14, 2022

(65) Prior Publication Data

US 2023/0025528 A1 Jan. 26, 2023

(30) Foreign Application Priority Data

Jul. 21, 2021 (DE) ...................... 10 2021 207 812.5

(51) Int. Cl.
| | |
|---|---|
| H02K 9/19 | (2006.01) |
| H02K 5/124 | (2006.01) |
| H02K 7/00 | (2006.01) |
| H02K 7/08 | (2006.01) |
| H02K 11/40 | (2016.01) |
| H02K 13/00 | (2006.01) |

(52) U.S. Cl.
CPC ............. *H02K 9/19* (2013.01); *H02K 7/003* (2013.01); *H02K 7/08* (2013.01); *H02K 11/40* (2016.01); *H02K 13/003* (2013.01); *H02K 5/124* (2013.01)

(58) Field of Classification Search
CPC .......... H02K 11/40; H02K 9/19; H02K 7/003; H02K 7/08; H02K 13/003; H02K 5/124; F16C 41/002; F16C 41/004; F16C 2380/26; H01R 4/64
See application file for complete search history.

(56) References Cited

U.S. PATENT DOCUMENTS

| | | | | |
|---|---|---|---|---|
| 8,488,293 | B2* | 7/2013 | Baumann ................ | F16C 19/06 |
| | | | | 361/220 |
| 9,634,547 | B1* | 4/2017 | Orlowski ............... | H02K 11/40 |
| 9,917,491 | B2* | 3/2018 | Northwall ............. | H02K 5/136 |
| 2021/0293279 | A1* | 9/2021 | Hubert .................... | H02K 11/40 |
| 2022/0154829 | A1* | 5/2022 | Muskat ................ | F16J 15/3288 |
| 2022/0255407 | A1* | 8/2022 | Chen ....................... | F16C 19/52 |

FOREIGN PATENT DOCUMENTS

| | | | | |
|---|---|---|---|---|
| DE | 102015214309 A1 | * | 2/2017 | |
| DE | 10 2019 133 677 A1 | | 6/2021 | |
| DE | 102020200821 | * | 7/2021 | ............. H02K 11/40 |
| EP | 2831469 B1 | * | 8/2019 | ......... F16H 57/0445 |
| JP | 2020 128 797 A | | 8/2020 | |

OTHER PUBLICATIONS

German Patent Office, Office Action issued in German Patent Application 10 2021 207 812.5 (Jun. 27, 2022).

* cited by examiner

*Primary Examiner* — Burton S Mullins

(74) *Attorney, Agent, or Firm* — Finch & Maloney PLLC

(57) ABSTRACT

Disclosed is an electric motor, in particular for a vehicle drive. In one example, the electric motor has a housing (12) and a rotor shaft (14) which is accommodated in the housing (12) such that it can rotate via bearings (16). The housing (12) and the rotor shaft (14) are electrically connected to one another via a singular electrically conductive contact ring (42) to ground the rotor shaft (14).

17 Claims, 5 Drawing Sheets

ELECTRIC MOTOR

RELATED APPLICATIONS

This application claims the benefit of and right of priority under 35 U.S.C. § 119 to German Patent Application no. 10 2021 207 812.5, filed Jul. 21, 2021, the contents of which are incorporated herein by reference in its entirety.

FIELD OF THE DISCLOSURE

The invention relates to an electric motor, in particular for a vehicle drive, comprising a housing and a rotor shaft which is accommodated in the housing such that it can rotate via bearings, wherein the rotor shaft is electrically grounded via the housing.

BACKGROUND

During the operation of electric motors, a variety of different types of currents are generated inside the motor. The grounding of rotor shafts of electric motors in order to avoid damaging bearing currents is well known from the prior art. Sparking can occur if an electrical charge is transferred across a gap between two components. This can lead to deposition of lubricant or pitting of components. It is a common practice to use shaft grounding rings to provide a current path from the rotor shaft to the housing. Such shaft grounding rings typically comprise brush-like fibers, which are disposed between a plurality of annular discs and are in contact with the rotor shaft to dissipate the damaging currents without creating much friction.

SUMMARY

The object of the invention is to create an electric motor comprising a rotor shaft that is grounded in a new way.

The object is achieved by an electric motor, in particular for a vehicle drive, comprising a housing and a rotor shaft which is accommodated in the housing such that it can rotate via bearings, wherein the housing and the rotor shaft are electrically connected to one another via a singular electrically conductive contact ring to ground the rotor shaft. The use of a singular electrically conductive contact ring makes it possible to achieve a particularly simple structure for grounding the rotor shaft, because a shaft grounding ring is no longer necessary.

The rotor shaft is preferably a hollow shaft and comprises an oil or cooling fluid-conducting channel in its interior and the housing comprises an inlet pipe that projects into an inlet opening of the channel, wherein the contact ring is disposed between the rotor shaft and the inlet pipe. This makes it possible to achieve a particularly easy-to-assemble structure, because the inlet pipe can be pushed into the inlet opening. The contact ring is thus furthermore disposed at a position at which its contact surface has a very small diameter, which significantly reduces the friction torque that arises at the contact ring.

In one design example, a receptacle for the contact ring is configured in the rotor shaft or in the inlet pipe.

In one design, the contact ring seals the oil or cooling fluid-conducting channel on an axial end region of the hollow shaft. There is therefore no need for an additional seal for the oil or cooling fluid-conducting channel in this axial end region, which simplifies the structure and saves costs.

The object is further achieved by an electric motor comprising a housing and a rotor shaft which is accommodated in the housing such that it can rotate via bearings, wherein the housing and the rotor shaft are electrically connected to one another via a series connection of singular electrically conductive contact rings. With the use of a series connection of singular electrically conductive contact rings there is likewise no longer a need for a conventional shaft grounding ring.

In one embodiment, a planetary transmission is coupled to the rotor shaft, wherein a first singular contact ring is disposed between the rotor shaft and a planet carrier and a second singular contact ring is disposed between the planet carrier and the housing, so that current can flow from the rotor shaft over the planet carrier to the housing. This arrangement makes it possible to implement a particularly simple series connection.

The contact ring is preferably made of steel or grey cast iron, i.e. a suitably electrically conductive material. Grey cast iron also exhibits very good emergency running properties.

In one design variant, the contact ring is made of an electrically conductive polymer. This makes it particularly easy to implement a sealing effect of the contact ring.

The contact ring preferably has a square cross-section. This makes it very easy to produce the contact ring and the receptacle for the contact ring. The contact ring can have a rectangular cross-section, for example.

Other cross-sectional shapes, such as trapezoidal or round, are possible as well.

In a further design variant, the contact ring comprises lubrication or oil pockets. Lubricating oil can thus be guided in a targeted manner by means of the contact ring.

In one design example, the contact ring is held exclusively via a groove in the rotor or in the housing. This makes it possible to achieve a particularly simple and cost-effective structure.

BRIEF DESCRIPTION OF THE DRAWINGS

Further features and advantages of the invention will be apparent from the following description and from the accompanying drawings, to which reference is made. The figures show.

DETAILED DESCRIPTION

Figure 1:
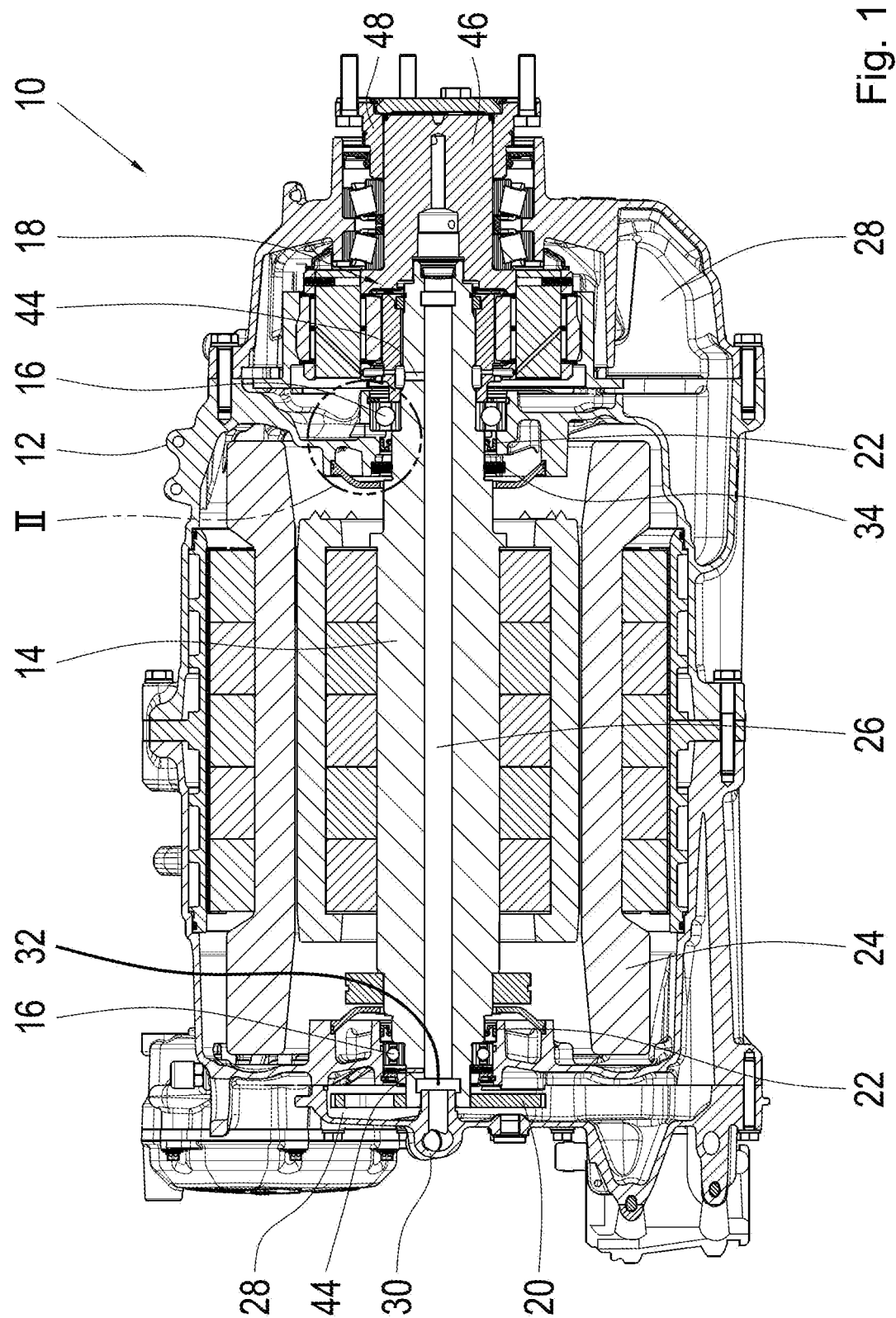
FIG. 1: a sectional view of an electric motor with a shaft grounding ring.

FIG. 1 shows an electric motor 10 for a vehicle drive comprising a housing 12 in which a rotor shaft 14 is accommodated such that it can rotate via bearings 16, which are designed here as ball bearings.

A transmission 18 is coupled to one axial end region of the rotor shaft 14 and an impulse disc 20 for rotation speed determination is mounted to the other axial end region.

The electric motor 10 is designed here as an induction motor with a rotor and a stator and the transmission 18 is configured as a planetary transmission. However, it is also conceivable that other types of electric motors and transmissions are used.

The rotor and the stator of the electric motor 10 are disposed here in a separate engine compartment 24 that is sealed by shaft sealing rings 22. The rotor is coupled to the rotor shaft 14, which is configured here as a hollow shaft comprising an oil-conducting channel 26. The two axial end regions of the rotor shaft 14 project into oil chambers 28 which are configured on axially opposite sides of the housing 12, wherein the oil-conducting channel 26 fluidically connects the two oil chambers 28 to one another. The oil chambers 28 serve as oil reservoirs in their lower region.

On the side of the rotor shaft 14 facing away from the transmission 18, there is an oil inlet pipe 30 which projects into an oil inlet opening 32 of the rotor shaft 14, so that the oil inlet pipe 30 and the oil-conducting channel 26 of the rotor shaft are fluidly connected to one another. The oil inlet pipe 30 is configured on the housing 12 of the electric motor 10.

Figure 2:
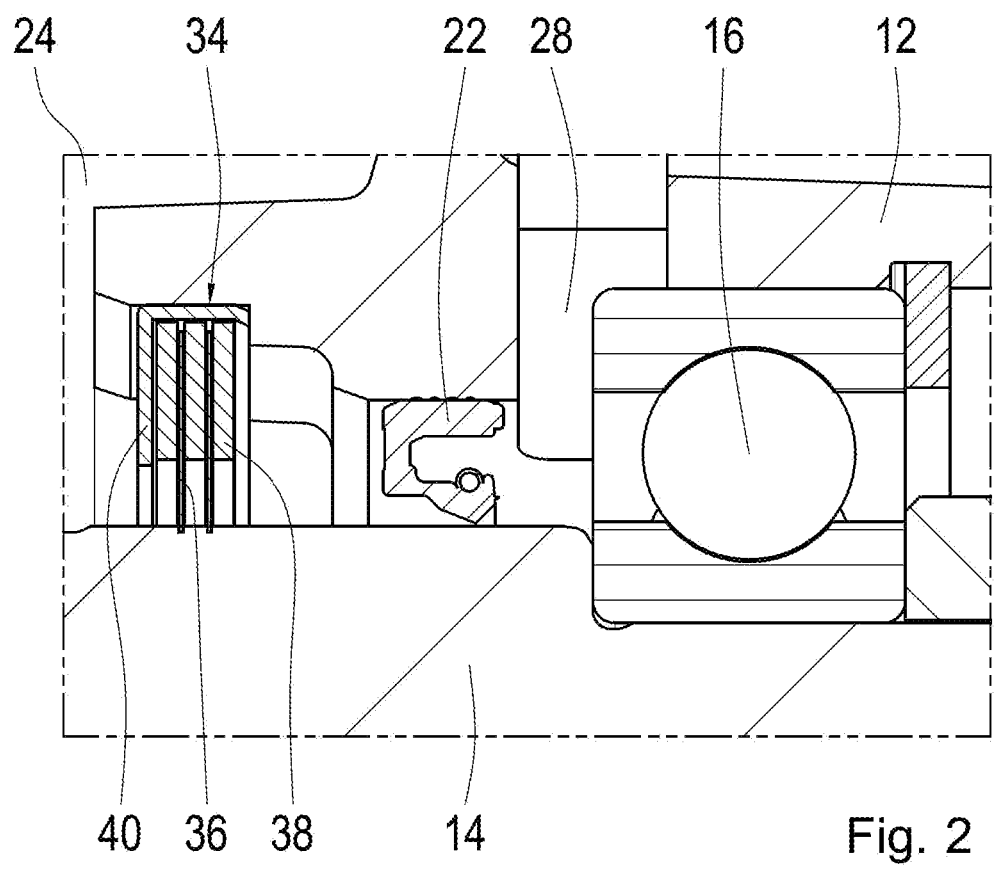
FIG. 2: the detail II from FIG. 1 with a shaft grounding ring according to the state of the art.

The arrangement for grounding the rotor shaft 14 according to the state of the art with a shaft grounding ring 34 is shown enlarged in FIG. 2. The shaft grounding ring 34 is disposed in the housing 12 and provides current paths from the rotor shaft 14 to the housing 12 via brush-like fibers 36. The brush-like fibers 36 are mounted between a plurality of annular discs 38 that are disposed in a base body 40. The shaft grounding ring 34 is disposed in a receptacle in the engine compartment 24.

Figure 3:
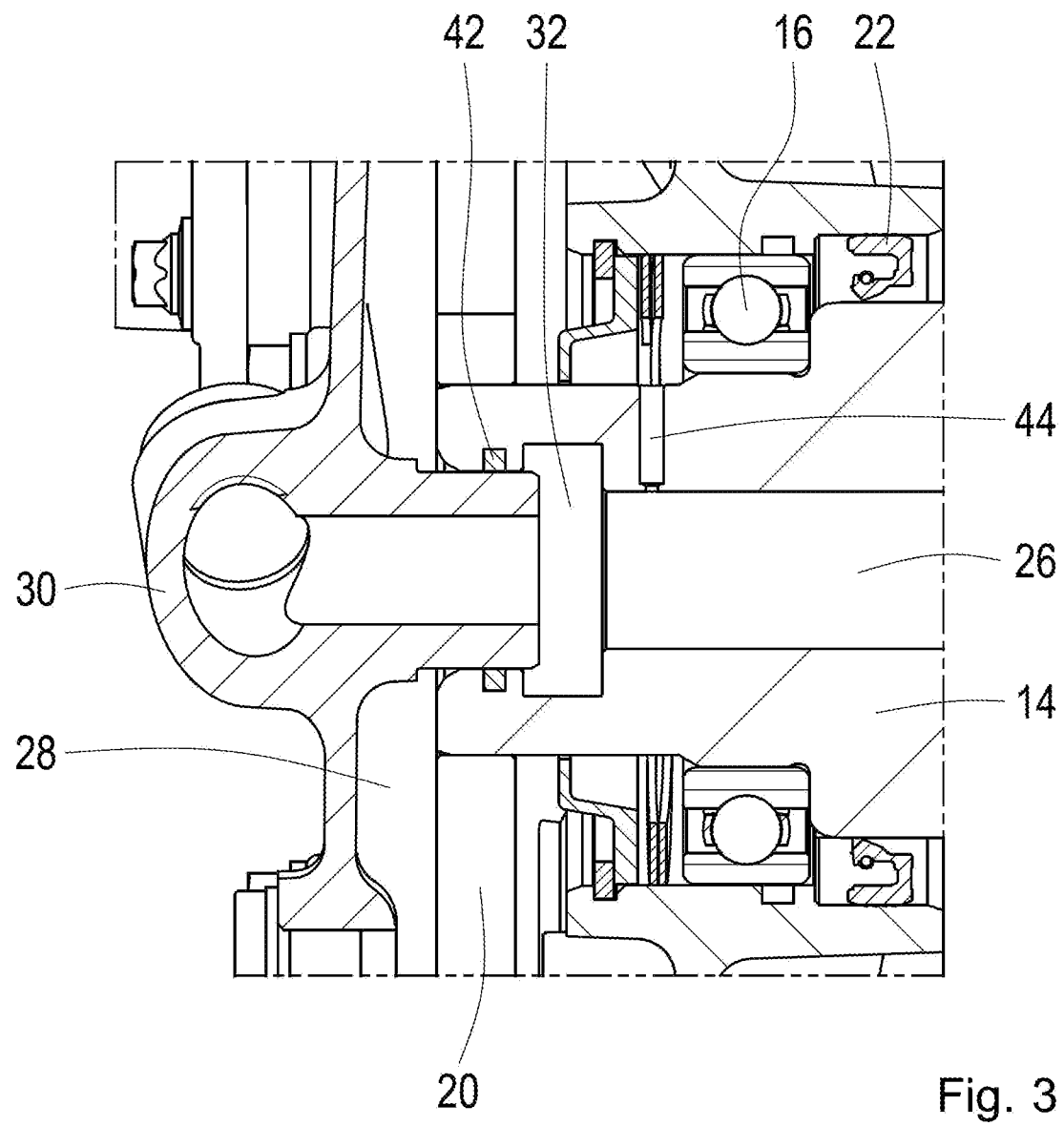
FIG. 3: an enlarged view of a first embodiment of an electric motor according to the invention with a contact ring in a rotor shaft.

FIG. 3 shows an enlarged view of the axial end region of the rotor shaft 14 facing away from the transmission 18, wherein the oil inlet pipe 30 projects into the oil inlet opening 32 of the rotor shaft 14. A singular electrically conductive contact ring 42 is disposed between the rotor shaft 14 and the oil inlet pipe 30 of the housing 12, so that a current path is provided from the rotor shaft 14 to the housing 12 without the use of a shaft grounding ring 34. There is consequently no need for a plurality of annular discs or for fibers. A singular ring assumes all of the functions of the many parts of the shaft grounding ring 34.

When the electric motor 10 is operated, currents, such as capacitive or circular currents, can arise, which flow from the rotor shaft 14 to the housing 12. The contact ring 42 provides a current path from the rotor shaft 14 to the housing 12 and grounds the rotor shaft 14.

The contact ring 42 is made of an electrically conductive material and the current path provided via the contact ring 42 has a lower electrical resistance than the current path via the bearings 16 or via the gears of the transmission 18, so that current that arises in the rotor shaft 14 during operation of the electric motor 10 flows from the rotor shaft 14 to the housing 12 via the contact ring 42 rather than via the bearings 16 or gears of the transmission 18. The contact ring 42 can be made of steel, grey cast iron or an electrically conductive polymer, for example.

Figure 4:
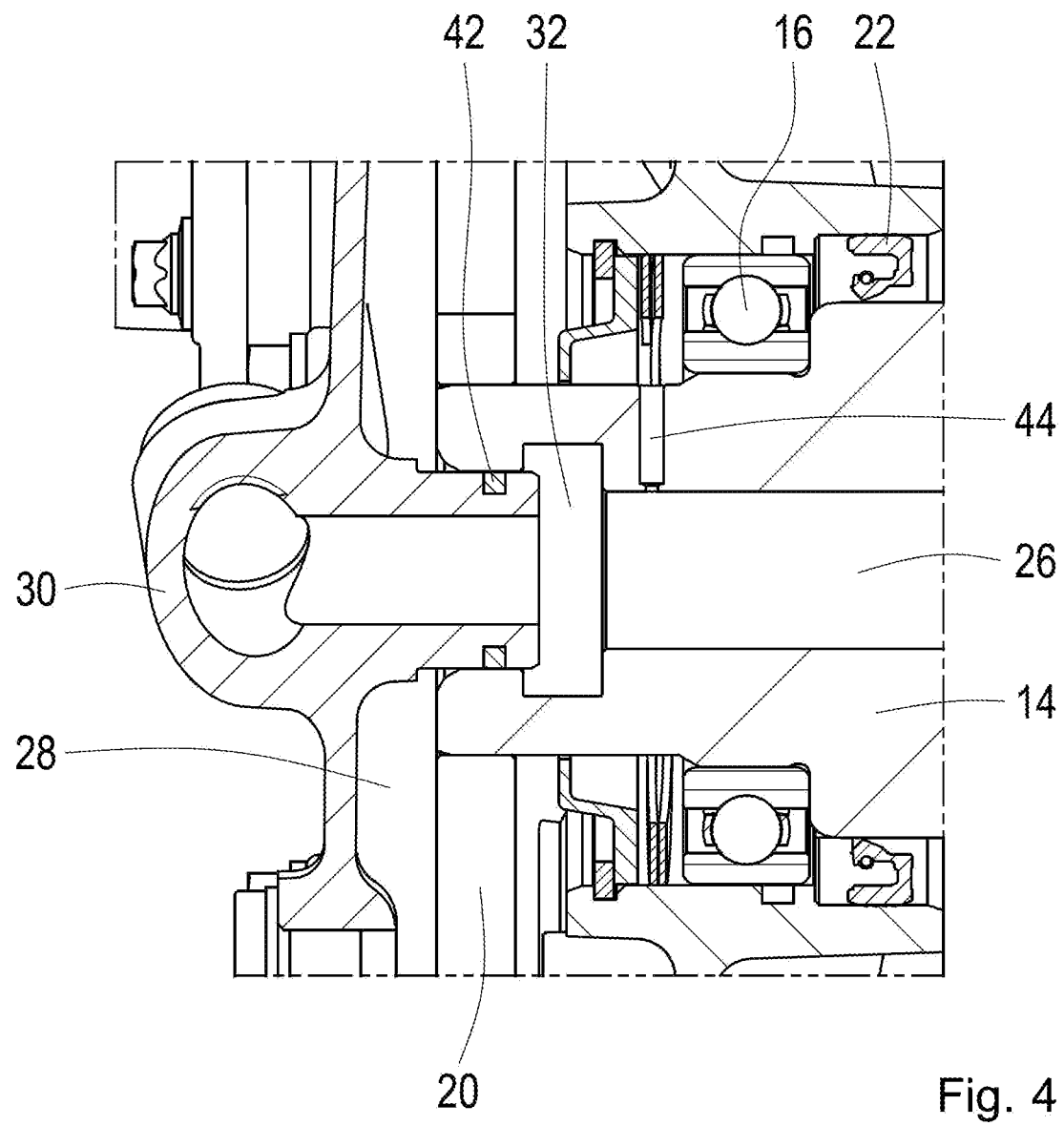
FIG. 4: an enlarged view of a second embodiment of an electric motor according to the invention with a contact ring in an inlet pipe

The contact ring 42 here is accommodated in a groove in the rotor shaft 14. In an alternative embodiment, the contact ring 42 can be accommodated in a groove in the oil inlet pipe 30 (see FIG. 4). However, it is also conceivable that the contact ring 42 be disposed between the rotor shaft 14 and the housing 12 at another location in the electric motor 10. The placement between the oil inlet pipe 30 and the rotor shaft 14 has the advantage that the contact ring 42 can be designed with a particularly small diameter of the friction surface, which reduces friction during operation.

In the shown design examples, the contact ring 42 has a rectangular cross-section.

However, it is also conceivable that the contact ring 42 has another easy-to-produce cross-section, for example a trapezoidal or round cross-section.

In the shown design example, the contact ring 42 also seals the oil-conducting channel 26 on an axial end region.

Figure 5:
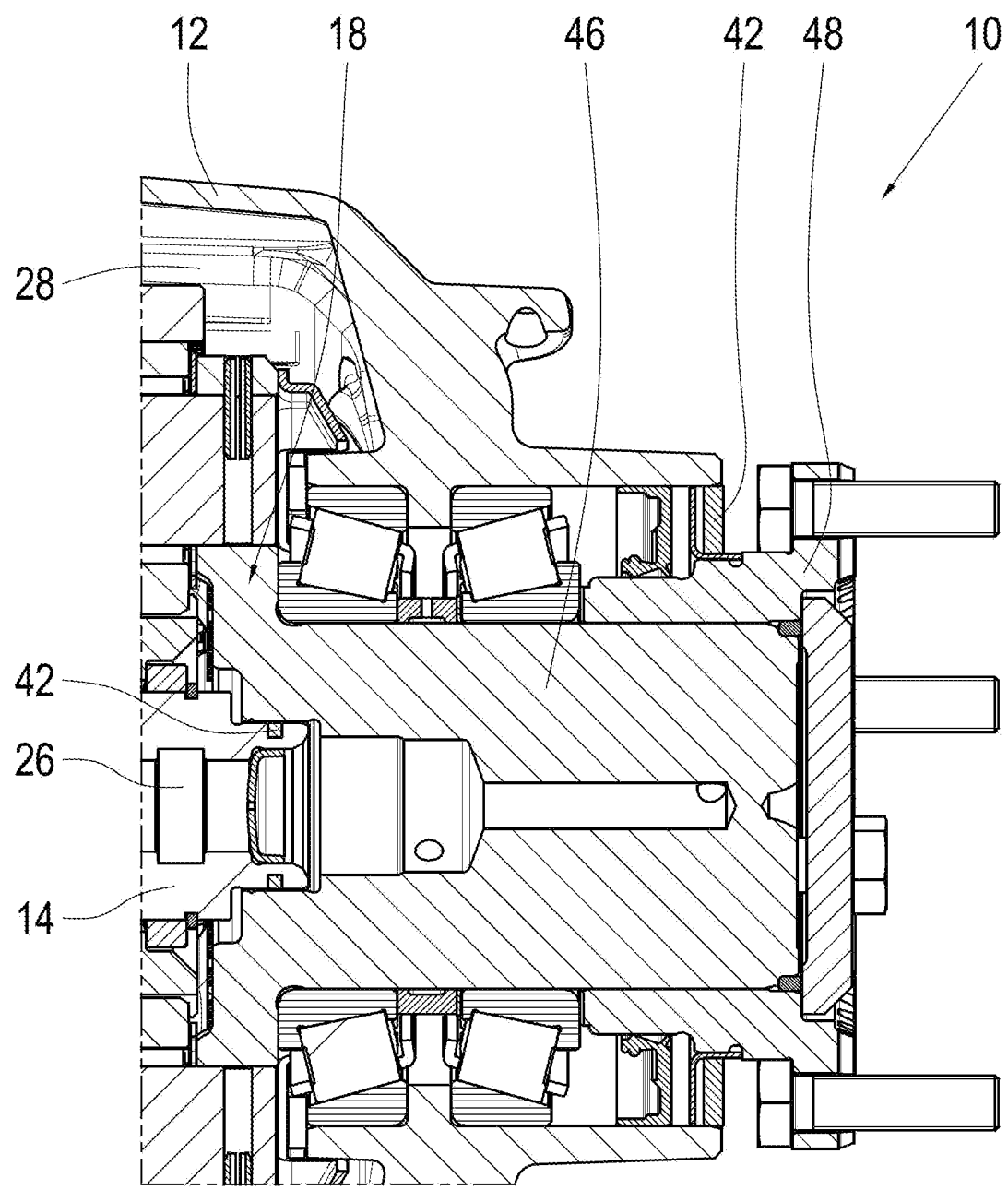
FIG. 5: an enlarged view of a third embodiment of an electric motor according to the invention with a series connection of contact rings.

FIG. 5 shows a further design variant of the electric motor 10 with a series connection of singular electrically conductive contact rings 42. Since the basic principle is the same as that of the embodiments of FIG. 3 and FIG. 4, only the differences are discussed in the following.

In the embodiment according to FIG. 5, two contact rings 42 are disposed in the electric motor 10.

A first contact ring 42 is disposed between the rotor shaft 14 and the transmission 18, and a second contact ring 42 is disposed between the transmission 18 and the housing 12. The first contact ring 42 is accommodated in a groove on the axial end region of the rotor shaft 14 to which the transmission 18 is coupled and forms an electrical connection from the rotor shaft 14 to a planet carrier 46 of the transmission 18. The contact ring 42 is positioned between the rotor shaft 14 and the transmission 18 in such a way that it has the smallest possible diameter on the friction surface.

The second contact ring 42 is mounted in a receptacle between the housing 12 and a mounting flange 48 of the planet carrier 46.

These two contact rings 42 form a series connection of contact rings 42, thereby providing a current path so that current can flow from the rotor shaft 14 via the planet carrier 46 to the housing 12.

LIST OF REFERENCE NUMERALS

10 Electric motor
12 Housing
14 Rotor shaft
16 Bearing
18 Transmission
20 Impulse disc
22 Shaft sealing rings
24 Engine compartment
26 Channel
28 Oil chambers
30 Oil inlet pipe
32 Oil inlet opening
34 Shaft grounding ring
36 Fibers
38 Annular discs
40 Base body
42 Contact ring
44 Lubrication duct
46 Planet carrier
48 Mounting flange

The invention claimed is:

1. An electric motor for a vehicle drive, the electric motor comprising:
  a housing;
  a rotor shaft being accommodated in the housing such that the rotor shaft can rotate via bearings;
  the rotor shaft being hollow and defining a fluid-conducting channel in an interior thereof, and the fluid-conducting channel having an inlet opening;
  the housing having an inlet pipe which projects into the inlet opening of the rotor shaft; and
  an electrically conductive contact ring electrically connecting the inlet pipe of the housing to the inlet opening of the rotor shaft, thereby electrically connecting the housing to the rotor shaft and grounding the rotor shaft.

2. The electric motor according to claim 1, wherein the contact ring seals the fluid-conducting channel on an axial end region of the rotor shaft.

3. The electric motor according to claim 1, wherein a receptacle for the contact ring is configured in the rotor shaft or in the inlet pipe.

4. The electric motor according to claim 3, wherein the contact ring seals the fluid-conducting channel on an axial end region of the rotor shaft.

5. The electric motor according to claim 1, wherein the contact ring is made of steel or grey cast iron.

6. The electric motor according to claim 1, wherein the contact ring is made of an electrically conductive polymer.

7. The electric motor according to claim 1, wherein the contact ring has a square cross-section.

8. The electric motor according to claim 1, wherein the rotor shaft or the housing defines a groove and the contact ring is held exclusively via the groove.

9. An electric motor comprising:
a housing;
a rotor shaft accommodated in the housing such that the rotor shaft can rotate via bearings; and
electrically conductive contact rings electrically connecting the housing and the rotor shaft with one another, and
a planetary transmission being coupled to the rotor shaft, and the planetary transmission including a planet carrier;
wherein the electrically conductive contact rings are arranged in a series connection and the electrically conductive contact rings includes a first contact ring located between the rotor shaft and the planet carrier and a second contact ring located between the planet carrier and the housing, so that current can flow from the rotor shaft through the planet carrier to the housing.

10. The electric motor according to claim 9, wherein the first and the second contact rings are made of material selected from steel, grey cast iron, and an electrically conductive polymer.

11. The electric motor according to claim 9, wherein a receptacle for at least one of the first and the second contact rings is configured in the rotor shaft or in the inlet pipe.

12. The electric motor according to claim 11, wherein one or more of the first and the second contact rings seals the fluid-conducting channel on an axial end region of the rotor shaft.

13. The electric motor according to claim 11, wherein the first and the second contact rings are made of material selected from steel, grey cast iron, and an electrically conductive polymer.

14. The electric motor according to claim 9, wherein one or more of the first and the second contact rings has a square cross-section.

15. The electric motor according to claim 9, wherein the rotor shaft or the housing defines a groove and one or more of the first and the second contact rings is held exclusively via the groove.

16. An electric motor for a vehicle drive, the electric motor comprising:
a housing;
a rotor shaft accommodated in the housing such that the rotor shaft can rotate via bearings; and
one or more electrically conductive contact rings electrically connecting the housing to the rotor shaft, thereby grounding the rotor shaft;
wherein the rotor shaft is hollow and defines a fluid-conducting channel in an interior of the rotor shaft, and the fluid-conducting channel has an inlet opening;
the housing comprises an inlet pipe that projects into the inlet opening; and
one of the one or more contact rings is located between the inlet opening of the rotor shaft and the inlet pipe of the housing to electrically connect the housing to the rotor shaft.

17. The electric motor of claim 16, further comprising a planetary transmission coupled to the rotor shaft, and the planetary transmission includes a planet carrier, wherein the one or more electrically conductive contact rings includes a first contact ring located between the rotor shaft and the planet carrier and a second contact ring located between the planet carrier and the housing, so that current can flow from the rotor shaft through the planet carrier to the housing.

* * * * *